Sept. 9, 1958  CHUNG LIAO FENG ET AL  2,851,554
CONTROL APPARATUS
Filed July 11, 1956  2 Sheets-Sheet 1

INVENTORS.
CHUNG L. FENG
ROBERT E. OCHS JR
BY
*Arthur H. Swanson*
ATTORNEY.

INVENTORS.
CHUNG L. FENG
ROBERT E. OCHS JR.
BY
ATTORNEY.

United States Patent Office 2,851,554
Patented Sept. 9, 1958

2,851,554

CONTROL APPARATUS

Chung Liao Feng, Philadelphia, and Robert E. Ochs, Jr., Oreland, Pa., assignors to Minneapolis-Honeywell Regulator Company, Minneapolis, Minn., a corporation of Delaware Application July 11, 1956, Serial No. 597,283

13 Claims. (Cl. 200—61.45)

The general object of the present invention is to provide a gravity compensating means for an accelerometer.

Prior to the present invention, accelerometers have been used to effect a control action such as the closing of a switch, when a predetermined acceleration of a moving body such as a guided missile, in which the accelerometer is mounted, is reached.

It is a more specific object of the present invention to provide an accelerometer which will more precisely cause such a switch action to occur when the acceleration of the rapidly moving body in which such a switch is located has reached a predetermined value than can be afforded by accelerometers that have heretofore been used.

The performance of present day accelerometers have heretofore been primarily restricted to missile applications in which a switching action is required to occur only during a time in which the missile is being accelerated in a single fixed trajectory path away from the earth's surface. However, more recent developments in the guided missile field have made it imperative that such an accelerometer switching action be able to occur at some precise instant of acceleration after the aforementioned initial fixed trajectory path of such a missile has been changed by remote control one or more times during a single flight of the missile. Accelerometers which have been available in the prior art have been unsatisfactory for one reason or another.

Such precise accelerometer switching as that mentioned supra can only be obtained if some type of gravity compensating means were devised for such an accelerometer that will compensate for changes in the direction of the gravitational force component acting on the missile during changes in the trajectory path in launching or flight of such a missile.

It is thus still another object of the invention to provide a means that will compensate an accelerometer for changes in the force of gravity acting on a guided missile whenever the direction of travel of such a missile is changed during flight. It is believed that the present invention therefore presents for the first time an accelerometer which can be relied on to more precisely affect a control action such as the closing of a switch in a control circuit when a desired predetermined acceleration of a missile is reached irrespective of the changes in direction of travel that may occur during launching or flight of such a missile.

A more specific object of the present invention is to provide a gravity compensating means for a guided missile which is in the form of a telescopic electrical contact weighted member that is swivelly mounted to the missile by means of a pair of gimbal rings in such a manner that the weighted contact member will be brought into direct engagement with a co-acting hemispherical contact surface fixedly attached to a missile only at the instant a predetermined acceleration of the missile is reached.

A still more specific object of the present invention is to provide a gravity compensating means that will cause the aforementioned telescopic contact weighted member to be linearly moved a distance away from its swivel point into engagement with the hemispherical contact by an amount that is always equal to the vector sum of the forces which represent the acceleration of the missile and the force of gravity acting on the weighted contact member.

Still another object of the present invention is to provide the aforementioned accelerometer switch in combination with a time delay circuit that is operably activated when the missile reaches a predetermined acceleration and the hemispherical contacts of the switch are engaged and which time delay circuit will affect a missile arming operation only after the contacts of the accelerometer switch are engaged and have remained continuously in contact with one another for a fixed period of time.

Still another and final object of the invention is to combine an accelerometer switch with a time delay circuit in the manner noted supra in which the aforementioned missile arming operation will become ineffective should the acceleration of the missile be reduced below the aforementioned predetermined acceleration any instant of time prior to the completion of the fixed period of time of engagement of said accelerometer's switch contact.

The various features of novelty which characterize this invention are pointed out with particularity in the claims annexed to and forming a part of this specification. For a better understanding of the invention, its advantages and specific objects attained with its use, reference should be had to the accompanying drawings and descriptive matter in which are illustrated and described preferred embodiments of the invention.

Figure 1:
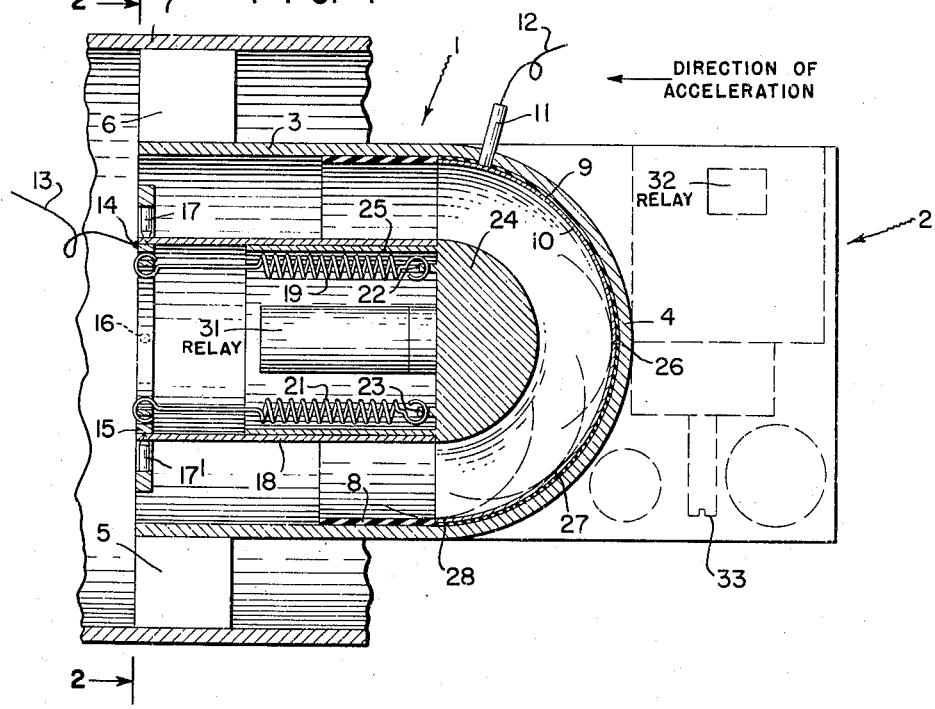
Fig. 1 shows a gravity compensating accelerometer switch used in conjunction with the time delay circuit.
Figure 2:
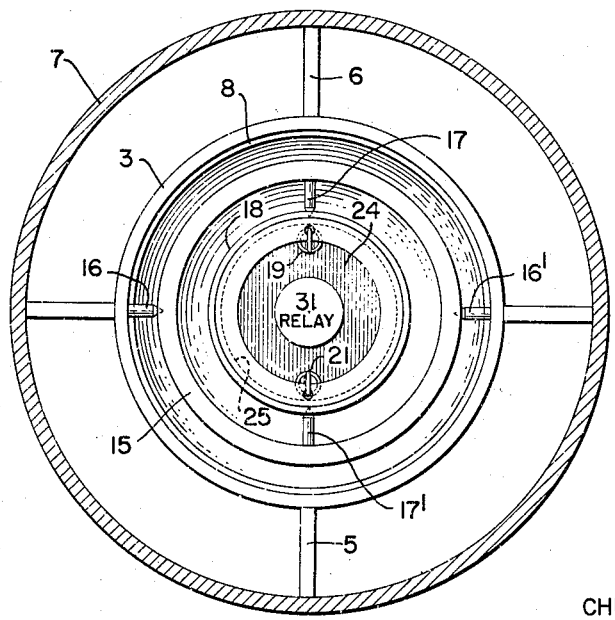
Fig. 2 shows a left end elevation view of the switch shown in Fig. 1.

Referring first to Fig. 1 of the drawing, there is shown an accelerometer switch 1 used in conjunction with a time delay arming circuit 2. The accelerometer switch 1 is comprised of an integral hollow member having a cylindrical portion 3 and a hemispherical portion 4. Suitable strut members 5, 6 are shown fixedly connected at their inner ends to the cylindrical outer surface of the portion 3 and fixedly connected at their outer ends to the interior of a guided missile 7. Fixedly connected to a portion of the interior wall of the cylindrical portion 3 there is shown an insulating sleeve 8. Fixedly connected to the interior wall of the hollow hemispherical member there is shown a layer of insulating material 9 and fixedly connected or bonded in any suitable manner to the interior of this hemispherical insulated covering there is shown an electrical contact surface 10 which may be made of suitable electrical conducting material. A suitable insulated plug connection 11 is shown connected at its inner end to the contact surface 10 and protruding therefrom through the other two walls of the hemisphere 9 and 4. The exterior of this plug 11 may be connected to one branch of an electrical circuit 12. Another branch of this same electrical circuit 13 may be connected by a suitable electrical connection at 14 to an inner gimbal ring 15. This inner gimbal ring is, in turn, pivotally connected to the end portion of the cylindrical part 3 by means of pivots 16, 16', as can best be seen in Fig. 2 of the drawing. This inner ring 15, in turn, supports the ends of a hollow telescopic guide member 18 by means of the pivots 17, 17', which is also best seen in Fig. 2 of the drawing. The inner gimbal ring 15 has connected thereto the left end of the coil spring member 19 and the coil spring member 21. Each of the other ends of these coil spring members 19, 21 are connected by means of suitable lugs 22, 23 to a solid hemispherical contact member 24. As can be seen in Fig. 1, the left end of the hemispherical contact member 24 has integrally connected thereto a hollow sleeve member 25 that is slidably supported in the guide 18. The members 18 and 25 may be used as slidable conductors as shown or current may be transmitted to the contact 24 by any other suitable means such as through the springs 19, 21.

The dot-dash line 26 shows how an outer peripheral point of the hemispherical contact member 24 will be brought into contact with the contact surface 10 when the missile 7 is accelerating at some predetermined value in the direction of the arrow shown in the drawing. Reference numerals 27 and 28 which are indicated in the dot-dash line form shown, represent other positions which the hemispherical contact surface of the member 24 will be moved to when the aforementioned acceleration of the missile 7 is attained when the missile is going in directions other than that shown by the arrow in the drawing.

Figure 3:
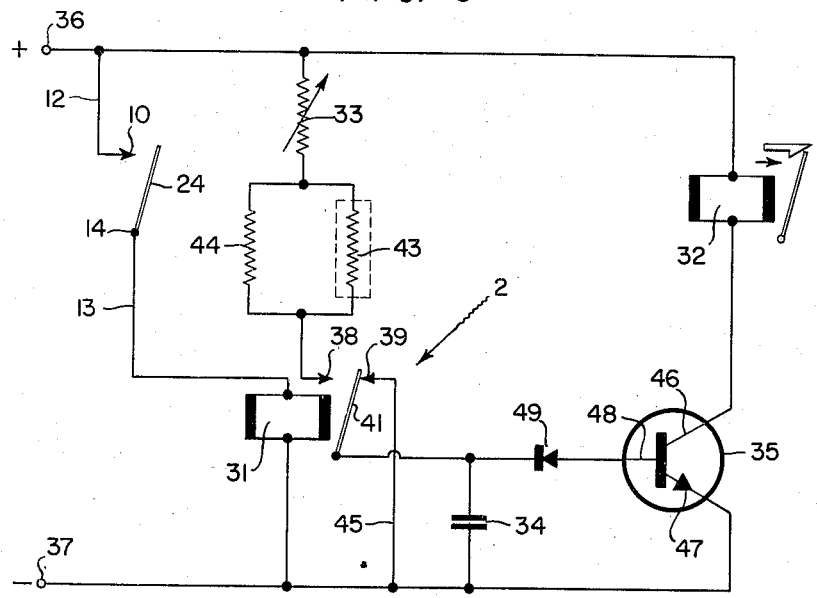
Fig. 3 shows a detailed view of the timing circuit shown in Fig. 1 that is energized by the accelerometer switch shown in Fig. 1.

Fig. 1 also shows how some of the chief components of the time delay circuit 2, that are shown in Fig. 3, may be located with respect to the accelerometer switch. Relay 31 is shown located in any suitable insulated manner connected to the interior of the telescopic contact member 25. A final control or arming relay 32, a variable resistance 33, a capacitor 34, and a transistor 35 are all schematically shown being located to the right of the accelerometer switch in Fig. 1 of the drawing.

Fig. 3 of the drawing shows a more complete arrangement of the time delay relay circuit 2 and its associated parts. It should be understood that time delay circuits other than the type shown in Fig. 3 may be used in conjunction with the accelerometer switch to perform the arming function recited in the earlier part of this specification. It should further be noted that the circuit shown in Fig. 3 is the same type of circuit as that shown in the Kenneth H. Beck patent application, Serial No. 597,273, filed on July 11, 1956, in the United States Patent Office. Besides the components 31—35 previously described under the description of Fig. 1 there is shown in Fig. 3 terminals 36, 37, stationary contact members 38, 39, a movable contact 41 that is activated by the action of the relay 31, a thermistor 43, a resistor 44, a conductor 45, a transistor collector 46, a transistor emitter 47, a transistor base 48, and a Zener diode 49.

Figure 4:
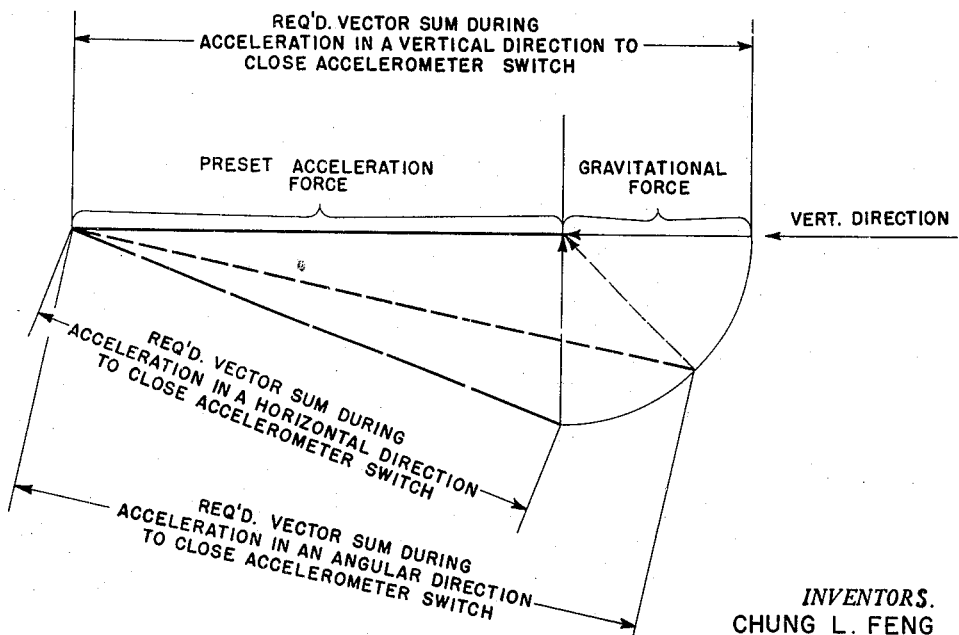
Fig. 4 shows a force diagram of the effect that the gravitational force has on the acceleration of the guided missile when the missile is moving in a horizontal, vertical, or inclined plane.

Fig. 4 of the drawing shows a thin solid horizontal force component that indicates the direction and magnitude of the gravitational force when the heavy solid line representing a preset acceleration force for a guided missile is reached and the missile is heading in the vertical direction indicated. The vector sum of the previously mentioned gravitational force component and the preset acceleration force component will be the resultant force that is obtained by adding the gravitational force component to the preset acceleration force component.

Fig. 4 also shows the direction of the gravitational force component that acts on the hemispherical contact 24, in a light dashed line form, when the missile is travelling in a direction other than in a vertical direction or horizontal direction with respect to the earth's surface. The heavy dashed line shown in this figure represents the vector sum or resultant force derived from the addition of the preset acceleration force component and the light dashed line gravitational force component.

Fig. 4 also shows a long vertical dash line that represents the gravitational force component acting on the hemispherical contact member 24 when the missile is going in a horizontal direction. The hypotenuse of the triangle formed from the preset acceleration force component and the vertical long dash line gravitational force component represents the vector sum of the aforementioned forces acting on the weight when the missile is going in a horizontal direction.

It can thus be seen from the vector diagram shown in Fig. 4 of the drawing that the vector sum of the gravitational force and preset acceleration force components decreases in magnitude as the missile is changing its directions from a vertical path to a horizontal one. It is, as heretofore been stated, one of the major objects of the present invention to provide an accelerometer switch which will not be effected in its switching function by changes in direction of the aforementioned gravitational force components when a preset acceleration of a missile is reached. Prior to the present invention such changes in the direction of this gravitational force component have caused errors amounting to one g.

In the operation of the accelerometer switch that is shown in Fig. 1 of the drawing, the solid hemispherical contact member 24 will be moved into tangential point contact at 26 with the contact surface 10 of the hollow hemispherical insulated member 4, 9 when the missile has reached such a preset acceleration.

When the missile is accelerating in an angular direction, the solid hemispherical contact member 24 will be caused to move outwardly to the right of the position shown in Fig. 1, by the acceleration force acting on the hemispherical member 24. Since the guide 18 is mounted by means of a gimbal ring 15 to move about the pivots 16 and 16' the contact member 24 will be caused to move not only to the right of the position shown but also in a slightly downward angular direction. When a preset acceleration such as, for example, three point five g's is reached, the hemispherical contact 24 will be brought in tangential point engagement with the contact surface 10.

Should the guided missile 7 be remotely positioned so that its longitudinal axis is turned 90 degrees counter-clockwise to that shown in Fig. 1 or, in other words, a condition in which the missile is travelling in a horizontal direction, the contact member 24 will be moved by the force of gravity in a downward direction and into contact with the insulated sleeve 8. If the acceleration of the missile 7 is then increased toward the preset value noted supra, the contact member 24 will be moved to the right along the insulated sleeve 8. The distance through which movement of the contact member 24 will move will, as indicated in Fig. 4, be directly related to the vector sum of the acceleration forces of the missile and the gravitational force acting on the weight 24. When a preset acceleration such as the three point five g's noted supra is reached, the force components acting on the weight 24 will be such that they will enable the tension of the spring 19 to be overcome and the contact 24 will have been moved into tangential point contact at 28 with the hemispherical contact surface 10. Should the acceleration of the missile drop below the necessary preset acceleration level after the contact member 24 has been engaged either at the point 26, 27, or 28, the force of the springs then in tension will be sufficient to withdraw the contact member 24 to the left and out of contact with the contact surface 10.

Because the contact member 24 is caused to move in this hemispherical manner along the contact surface 10 while the missile is changing its direction from a vertical to a horizontal position this apparatus will cancel out any errors due to changes in the gravitational force acting on the missile when such changes in direction of the missile occur.

When a contact has been made between the contact member 24 and the hemispherical contact surface 10 either at contact point 26, contact point 27, or contact point 28, the Kenneth H. Beck time delay relay circuit including the relay 31 will be energized. Upon energization of the relay 31 the movable contact 24 engages the stationary contact 38 which connects the capacitor 34 in series with the resistor 33 and the parallel combination of the thermistor 43 and the resistor 44 across the terminals 36 and 37. The capacitor 34 then charges at a rate determined by the time constant of the timing circuit. The capacitor 34 charges at this rate until the voltage across the capacitor 34 is equal to the breakdown voltage of the Zener diode 49 and the very small voltage drop across the base emitter circuit of the transistor 35. When the voltage in capacitor 34 is equal to the breakdown voltage of the Zener diode 49 current will begin to flow in the emitter base circuit of the transistor 35. As the voltage across the capacitor 35 continues to increase the transistor base current increases and the transistor collector current will increase until the final control latching in relay 32 is energized. Once this final control latching relay 32 is energized, it will remain in this latched or armed position even though the acceleration of the missile then drops to a value lower than the value that is required to keep the contact member 24 in engagement with the contact surface 10.

However, if the accelerometer contacts 10, 24 are open any time during the time delay interval in which the capacitor is being charged the relay 31 will be de-energized through the movable relay contact 41, the stationary relay contact 39, and the conductor 45. If the contacts 10, 24 of the accelerometer switch are subsequently closed, the circuit of Fig. 3 will be in condition to again start the time delay operation.

It can thus be seen that the accelerometer switch of the present invention may be combined with a time delay circuit such as that devised by Kenneth H. Beck noted supra, which accelerometer switch is operably activated when a missile reaches a predetermined acceleration and its hemispherical contacts are engaged and which time delay circuit will affect a missile arming operation by means of the latching in relay 32 only after the contacts of the accelerometer switch are engaged and have remained continuously in engagement with one another for a fixed period of time that will be dependent on the settings of the elements used in the time delay circuit.

The present invention has also thus made use of an accelerometer switch in combination with a time delay circuit in which a missile arming operation will become ineffective as noted supra should the acceleration of the missile be reduced below a predetermined acceleration at any instant of time prior to the completion of the fixed period of time in which said accelerometer switch contacts must be engaged to latch in the arming relay.

Subject matter disclosed but not claimed herein is being disclosed and claimed in the co-pending application of Kenneth H. Beck filed on even date herewith and assigned to the same assignee.

While, in accordance with the provisions of the statutes, we have illustrated and described the best form of the invention now known to us, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described our invention, what we claim as new and desire to secure by Letters Patent is:

1. A gravity compensating means for an accelerometer switch comprising, an outer gimbal ring fixedly secured to a moving body, an inner gimbal ring pivotally secured at its outer peripheral portion to said outer ring for rotation on an axis that is normal to a vertical plane passing through the longitudinal axis of said body, a hollow cylindrical means positioned within said inner gimbal ring, a means located in said vertical plane to mount one end of said cylindrical means to said inner ring, a gravity compensating member having a weight contact portion extending beyond the other end of said cylindrical means and having a hollow cylindrical portion in slidable engagement with the internal surface of said hollow cylindrical means, a means for resiliently connecting said weight contact member to said one end of said cylindrical means, a contact member of hemispherical configuration spaced from said weight contact portion and fixedly connected at its outer surface to said moving body and said contact member having an inner surface acting as a second part of a switch contact member when said acceleration of said moving body attains a predetermined value and said weight contact portion is caused to engage said inner surface.

2. The gravity compensating means as set forth in claim 1 in which the distance through which the weight contact portion will be caused to travel towards said contact member for any given acceleration will be equal to the vector sum of the forces which represent said given acceleration of the moving body and the force of gravity acting on the weight portion.

3. A gravity compensating means for an accelerometer switch comprising, a moving body having a pair of gimbal rings pivotally mounted therein, a guide fixedly connected at one end to one of said rings, a first contact member of solid hemispherical configuration mounted for slidable engagement in said guide and connected by means of a resilient member to said end of said ring, a hollow hemispherical contact member fixedly connected to an initially spaced from said moving body, said first contact member being located at said spaced distance from said hollow hemispherical contact member as long as the acceleration of said moving body is below a preset value and said first contact member being operably slid along said guide into contact with said hollow contact member whenever said preset acceleration of said moving body is reached.

4. A means for compensating an accelerometer switch for changes in the force of gravity acting on the accelerometer as the angular direction of travel of the accelerometer is altered comprising, a first solid hemispherical contact member spring mounted on a pair of gimbal rings forming one part of a switch member, a hollow hemispherical contact member forming the remaining part of said switch member, a guide means connected to said gimbal for guiding said weight contact into engagement with said hollow hemispherical contact member when the acceleration of said hollow hemispherical contact member reaches a predetermined value.

5. A gravity compensating means for altering the time required to close an acceleration responsive switch comprising, a solid hemispherical switch contact member resiliently mounted for arcuate movement in a pair of gimbal rings that are attached to a moving body, a hollow hemispherical switch contact member surrounding and spaced from said solid switch contact and means connected to said gimbals for guiding said solid switch contact into engagement with different portions of said hollow switch contact as said angular direction of the moving body is changed.

6. In an acceleration responsive switch comprising, two spaced apart hemispherical contact members for affecting a switching action when said contacts are moved into point contact with one another, a spring means connected at one end to a swivel joint and at its other end to one of said contact members, said swivel and spring means acting to operably permit said one contact member to tangentially contact the surface of said other contact member whenever the vector sum of the acceleration force acting on said other contact and the gravitational force acting on said one contact member reaches a predetermined value.

7. In an acceleration responsive switch comprising, two spaced apart hemispherical contact members that are of different radial dimensions for affecting a switching action when said contacts are moved into point contact with one another, a spring means connected at one end to a swivel joint and at its other end to the contact member having the smallest of said radial dimensions, said swivel and spring means acting to operably permit said last mentioned contact member to tangentially contact the surface of the other of said contact members whenever the vector sum of the acceleration force acting on the contact member having the largest radial dimension and the gravitational force acting on the contact member having the smallest radial dimension reaches a predetermined value.

8. In an accelerometer for affecting a switch closing action when a rapidly moving missile reaches a predetermined acceleration comprising, a gravity compensating means for moving two hemispherical contacts in a direct linear relationship towards one another at a rate determined by the vector sum of the acceleration of the said missile and the force of gravity acting on one of said contacts and said gravity compensating switch means acting to cancel out any errors due to changes in the direction of the gravitational force acting on the accelerometer when said direction of flight of said missile is altered.

9. A gravity compensating means for an accelerometer switch comprising, a solid hemispherical switch contact member swivelly mounted by means of a spring at one end to a portion of a guided missile through which the longitudinal axis of said missile passes and another end of said contact switch member being free to move instantly into engagement with a hollow hemispherical switch contact surface by the extension of said spring during any angular deviation in the direction of the missile while in flight and whenever a predetermined acceleration of said missile has been attained.

10. The combination of an accelerometer gravity compensated means of claim 9 with a missile timing mechanism wherein said timing mechanism is operably connected to said accelerometer switch contacts to close an arming switch after said accelerometer switch contacts have been retained continuously in contact with one another for a predetermined period of time.

11. The combination of an accelerometer gravity compensated means of claim 9 with a missile timing mechanism wherein said timing mechanism is operably connected to said accelerometer switch contacts to close and lock in a time delay arming switch after said accelerometer switch contacts have been retained continuously in engagement with one another for a predetermined period of time and wherein said operable connection between said accelerometer and said timing mechanism being further operable to prevent said time delay arming switch from being closed and locked in if said acceleration of the said missile is reduced below said predetermined value any time during said period of continuous engagement between said contacts of the accelerometer.

12. The accelerometer gravity compensated means of claim 9 wherein said gradient of said spring will cause said free end of said contact member to be withdrawn from said engaged position whenever the acceleration of the missile is reduced below said predetermined value and wherein said spring is operable to again be activated to move said free end of said contact member into engagement with said switch contact surface whenever said missile thereafter regains the said predetermined acceleration.

13. In an acceleration responsive switch comprising, two spaced apart hemispherical contact members that are of different radial dimensions for affecting a switching action when said contacts are moved into point contact with one another, coil spring members each connected at one of their ends to a swivel joint and at each of their other ends to the contact member having the smallest of said radial dimensions, said swivel and spring members acting to operably permit said last mentioned contact member to tangentially contact the surface of the other of said contact members whenever the vector sum of the acceleration force acting on the contact member having the largest radial dimension and the gravitational force acting on the contact member having the smallest radial dimension reaches a predetermined value.

References Cited in the file of this patent

UNITED STATES PATENTS

| | | |
|---|---|---|
| 2,662,945 | Cockram | Dec. 15, 1953 |
| 2,770,452 | Miller | Nov. 13, 1956 |